G. W. ALDRICH.
Liquid Measuring Tank and Cock.
No. 228,799.                    Patented June 15, 1880.
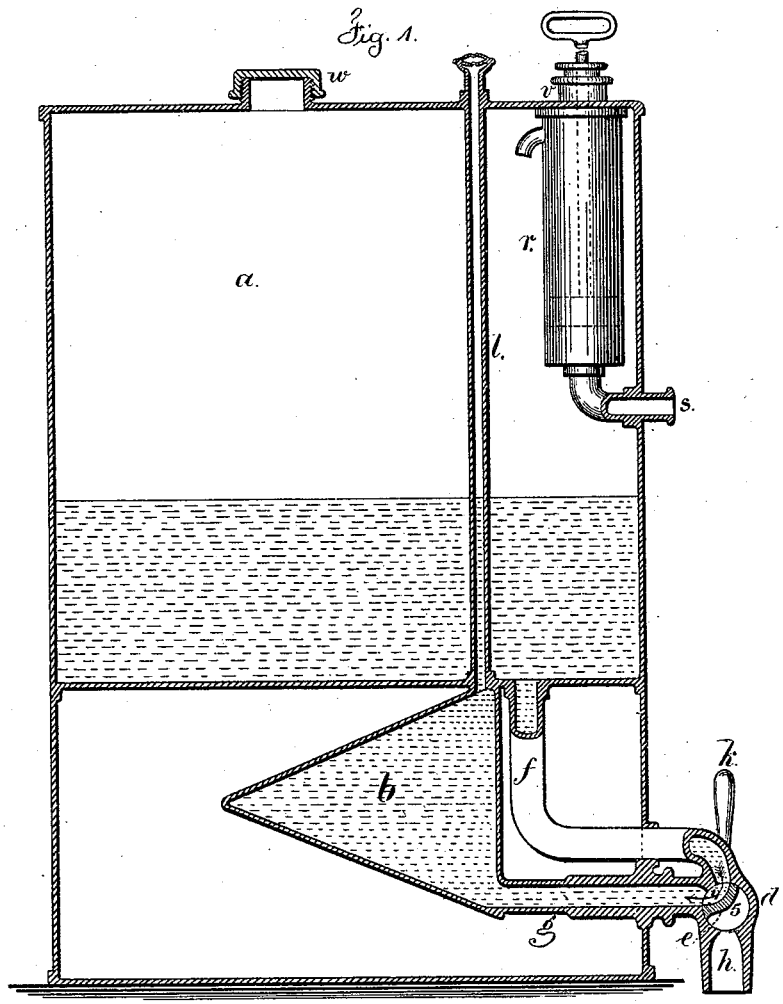
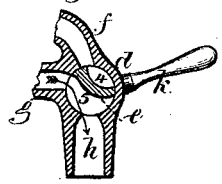 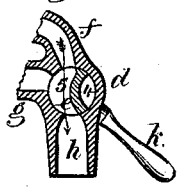 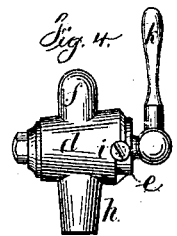
Witnesses
Chas. H. Smith
Geo. F. Pinckney
Inventor
George W. Aldrich
per Lemuel W. Serrell
Atty

UNITED STATES PATENT OFFICE.

GEORGE W. ALDRICH, OF BROOKLYN, NEW YORK.

LIQUID-MEASURING TANK AND COCK.

SPECIFICATION forming part of Letters Patent No. 228,799, dated June 15, 1880.

Application filed September 15, 1879.

*To all whom it may concern:*

Be it known that I, GEORGE WASHINGTON ALDRICH, of Brooklyn, in the State of New York, have invented an Improvement in Tanks and Measures for Liquids and in Cocks Adapted to the Same and to other uses, of which the following is a specification.

This improvement relates to a tank or vessel that is adapted to contain coal-oil or other liquid; and beneath this tank there are one, two, or more measuring-vessels, each of which is provided with a peculiar cock that has three tubes to the barrel of the cock. One leads down from the tank holding the liquid, the other passes into the measure, and the third is a tube or bib for the delivery of the oil or liquid.

The plug of the cock is constructed in such a manner that when turned into one position the liquid flows from the vessel into the measure, the air escaping from the measure through a small tube leading to the top of the oil-tank. When the plug is turned into the second position the passage is stopped between the tank and measure and the liquid allowed to discharge from the measure; and when the plug is turned into the third position the contents of the tank and measure are allowed to run freely at the same time, so as to empty the tank or vessel when desired. The cock has a stop to prevent it being turned accidentally into the third position before named; and the air-tube is provided with a whistle, for the purpose of indicating when the liquid is running into or out of the measure.

In the drawings, Figure 1 is a vertical section of the tank and measure; and Figs. 2, 3, and 4 represent the various positions of the plug of the cock.

The tank $a$ is of a size adapted to hold whatever quantity of oil it may be desired to store, and this vessel will usually be of sheet metal. The measure $b$ is below the tank, and for this purpose the tank is to be supported by its cylindrical case extending down below the bottom; or any other desired means may be used to support the tank.

There are one, two, or more of the measures $b$ of different sizes. I have shown but one such measure, and it is to be understood that each measure has its three-way cock and connecting tubes.

The barrel $d$ of the cock has within it a plug, $e$. The pipe $f$ supplies oil from the tank $a$ to the barrel of the cock, and the pipe $g$ leads from the barrel $d$ of the cock to the measure $b$, so that when the passage-way 4 of the plug is at the ends of the pipes $f$ and $g$ oil will flow from the tank $a$, by the pipe $f$, passage 4, and pipe $g$, into the measure $b$, and while this is filling the air is free to escape above the tank by the small pipe $l$. The handle $k$ of the plug $e$ will usually be placed in relation to the plug as shown, so as to stand vertically, as represented in Fig. 1, while the measure is filling.

When the handle and plug are turned into the position shown in Fig. 2, the pipe $f$, supplying oil, is closed, and the passage-way 5 of the plug comes into position, so as to convey the liquid from the measure $b$ and pipe $g$ to the delivery bib or pipe $h$.

There is to be a stop to prevent the plug being turned beyond this position, so that oil cannot waste or run direct from the fountain. This stop is shown at $i$, Fig. 4, as a screw, that takes against the end of the recess or shoulder of the barrel. When this screw or stop has been removed the plug can be turned around to bring the passage-way 5 into the position shown in Fig. 3, with the tubes $f$ and $g$ open to the discharge-tube $h$, to allow the contents of the tank and the measure to discharge freely.

It is to be understood that this screw or stop is only to be removed when it is desired to open the passages for the rapid discharge of the contents of the tank. At other times it will remain in place.

This cock is to be distinguished from other three-way cocks, because its construction allows the liquid to be drawn from either one or two pipes and delivered by a third pipe or opening.

The pump $r$ is, by preference, placed within the tank. It has an inlet-pipe, $s$, at one side passing through the tank, so that a hose may be attached thereto for drawing the oil from a barrel. The top part of the pump is inside the tank, so that the oil overflows into such tank; but the pump-rod passes through the cap $v$ upon the top of the tank.

A cover, $w$, is provided for the tank to give access for cleaning. The same is shown as made of a sheet-metal screw-cap.

I place upon the air-tube $l$ a whistle or signal, that gives an alarm during the time that the measure is either filling or being emptied by the action of the air. This prevents risk of drawing off before the measure is full or shutting off before the measure is emptied.

I am aware that a three-way cock has been used with a tank and measure, and the cock has been made with a hole through the plug and a lateral inlet to the same.

In my cock the plug has only two passage-ways, one larger than the other, and a curved separating-plate between these passages, so that the passage-ways are very free, and the cock is simple and cheap, and I arrange the pipes from the tank and measure to the cock so as to be simple and direct.

I claim as my invention—

The combination, with a tank for liquids and measures beneath the same, of a cock having a horizontal plug with a large passage-way, 5, and small passage-way 4, and a barrel, $d$, and pipes $f$ and $g$, connecting to the tank and measure, respectively, and a discharge-tube, $h$, substantially as set forth.

Signed by me this 19th day of July, A. D. 1879.

GEORGE W. ALDRICH.

Witnesses:
GEO. T. PINCKNEY,
CHAS. H. SMITH.